United States Patent
Liu et al.

(10) Patent No.: US 10,341,850 B2
(45) Date of Patent: Jul. 2, 2019

(54) METHOD FOR IDENTIFYING SOURCE BSS IN WLAN

(71) Applicants: MEDIATEK INC., Hsin-Chu (TW); Jianhan Liu, San Jose, CA (US); Tianyu Wu, San Jose, CA (US); Thomas Edward Pare, Jr., Mountain View, CA (US)

(72) Inventors: Jianhan Liu, San Jose, CA (US); Tianyu Wu, San Jose, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 15/117,448

(22) PCT Filed: Feb. 10, 2015

(86) PCT No.: PCT/US2015/015293
§ 371 (c)(1),
(2) Date: Aug. 8, 2016

(87) PCT Pub. No.: WO2015/120488
PCT Pub. Date: Aug. 13, 2015

(65) Prior Publication Data
US 2016/0353275 A1 Dec. 1, 2016

Related U.S. Application Data

(60) Provisional application No. 61/937,723, filed on Feb. 10, 2014, provisional application No. 62/100,623, filed on Jan. 7, 2015.

(51) Int. Cl.
*H04W 8/26* (2009.01)
*H04W 48/16* (2009.01)
(Continued)

(52) U.S. Cl.
CPC ............... *H04W 8/26* (2013.01); *H04L 47/32* (2013.01); *H04W 16/10* (2013.01); *H04W 48/16* (2013.01); *H04W 84/12* (2013.01)

(58) Field of Classification Search
CPC ....... H04W 8/26; H04W 16/10; H04W 48/16; H04W 84/12; H04W 72/0406;
(Continued)

(56) References Cited

U.S. PATENT DOCUMENTS

2005/0070270 A1  3/2005  Akiyama
2006/0252443 A1  11/2006  Sammour
(Continued)

OTHER PUBLICATIONS

Simone Merlin et al., Partial AID, IEEE P802.11, Wireless LANs, Jul. 18, 2011, doc.: IEEE 802.11-11/0991r1, XP068036953.
(Continued)

*Primary Examiner* — Peter Chen
(74) *Attorney, Agent, or Firm* — Winston Hsu

(57) ABSTRACT

A method for identifying source BSS in WLAN is proposed. A high efficiency (HE) access point (AP) sends a packet containing a basic service set (BSS) color to a HE station. The HE AP also sends a packet containing an assigned association identification (AID) to a very high throughput (VHT) station. The assigned AID comprises at least part of the BSS color information. The VHT station therefore sends a packet containing the at least part of the BSS color information such that any AP or station that receives the packet can determine the BSS the VHT station is in.

5 Claims, 3 Drawing Sheets

(51) Int. Cl.
*H04W 16/10* (2009.01)
*H04L 12/823* (2013.01)
*H04W 84/12* (2009.01)

(58) Field of Classification Search
CPC ............ H04W 74/0816; H04W 74/08; H04W 74/006; H04W 74/04; H04W 88/08; H04L 5/0048; H04L 5/0044; H04L 47/32
See application file for complete search history.

(56) References Cited

U.S. PATENT DOCUMENTS

| | | |
|---|---|---|
| 2008/0259936 A1 | 10/2008 | Hussain |
| 2011/0310834 A1 | 12/2011 | Seok |
| 2014/0010177 A1 | 1/2014 | Wentink |
| 2015/0110093 A1* | 4/2015 | Asterjadhi ............ H04W 74/08 370/338 |
| 2016/0242210 A1* | 8/2016 | Seok ..................... H04W 28/18 |
| 2016/0338047 A1* | 11/2016 | Seok ..................... H04B 7/2643 |

OTHER PUBLICATIONS

Jianhan Liu et al., AID Assign Rule Based on BSS Color and HE Operation Element, Mar. 11, 2016, IEEE802.11-16/0364r3, XP055365823.

"International Search Report" dated May 15, 2015 for International application No. PCT/US15/15293, International filing date: Feb. 10, 2015.

* cited by examiner

METHOD FOR IDENTIFYING SOURCE BSS IN WLAN

CROSS REFERENCE TO RELATED APPLICATIONS

This application claims priority under 35 U.S.C. § 119 from U.S. Provisional Application No. 61/937,723, entitled "Methods of Identifying the Source BSS of Received Packets in Wireless Local Area Networks," filed on Feb. 10, 2014; U.S. Provisional Application No. 62/100,623, entitled "Methods of Identifying the Source BSS of Received Packets in Wireless Local Area Networks ," filed on Jan. 7, 2015; the subject matter of which is incorporated herein by reference.

TECHNICAL FIELD

The disclosed embodiments relate generally to wireless network communications, and, more particularly, to a method for indentifying source basic service set (BSS) in wireless communications systems.

BACKGROUND

IEEE 802.11 is a set of media access control (MAC) and physical layer (PHY) specification for implementing wireless local area network (WLAN) communication, which is also known as Wi-Fi, in the unlicensed (2.4, 3.6, 5, and 60 GHz) frequency bands. The standards and amendments provide the basis for wireless network products using the Wi-Fi frequency bands.

According to the standards, an association identity (AID) is a value assigned by an access point (AP) to represent a 16-bit ID of a station (STA), and a basic service set identification (BSSID) is a 48-bit field of the same format as an IEEE 802 MAC address. The AID is used to identify a STA and the BSSID is used to identify a basic service set (BSS). Since AID and BSSID are inserted into the MAC header or as a management element and therefore belongs to data portion of a packet, they are mostly modulated by high modulation and coding scheme (MCS). Therefore, whether AID and BSSID are correctly received can only be found out until the whole packet is decoded. If a STA receives a packet that is not destined to itself, which means the STA is not the destination of the received packet, the STA needs to decode the whole packet to know it. In many cases, a STA wastes a lot of power decoding packets that are not sent to itself.

To avoid or reduce the frequency of unnecessary decoding of the whole packet, partial AID is introduced in the IEEE 802.11ac standard. A system based on IEEE 802.11ac standard is known as Very High Throughput (VHT) system. IEEE 802.11ac also introduce Partial AID that is a non-unique STA ID assigned by AP or STA. Partial AID is included in VHT_SIG-A1 symbol (the first symbol of VHT-SIG-A symbols), as shown in FIG. 1.

Because VHT-SIG-A symbols are Pre-VHT-modulated fields and include an 8-bit CRC check, the symbols can be easily decoded. When a STA receives a VHT (Very High Throughput) PLCP (PHY Layer Convergence Procedure) protocol data unit (PPDU) with a format shown in FIG. 2, it can determine whether the PPDU is sent to itself or another STA by checking the partial AID after decoding the VHT SIG-A. If the PPDU is not for itself, the STA can turn off receiver for the rest of the PPDU or discard the rest of the PPDU to save power.

In VHT WLAN, the partial AID is defined as shown in Table 1.

TABLE 1

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a DLS or TDLS peer STA | 63 | $(\text{dec}(AID[0:8]) + \text{dec}(BSSID[44:47]) \oplus BSSID[40:43])$ $(9\text{-}8a) \times 2^5) \mod 2^9$ where $\oplus$ is a bitwise exclusive OR operation mod X indicates the X-modulo operation dec(A[b:c]) is the cast to decimal operator where b is scaled by $2^b$ and c by $2^{c-b}$ |
| Otherwise (see NOTE) | 63 | 0 |

NOTE
The last row covers the following cases:
A PPDU sent to an IBSS STA
A PPDU sent by an AP to a non associated STA
Any other condition not explicitly listed elsewhere in the table The Group ID is 0 or 63 to indicate the PPDU is for single user (SU) transmission. For an infrastructure BSS, the Group ID is set to 0 to indicate an uplink transmission and to 63 to indicate a downlink transmission.

In dense networks with overlapped BSS (OBSS), a tradeoff between receive sensitivity and spatial reuse should be considered. In current WLAN, when a STA receives a packet on its primary channel, the STA decodes the pre-VHT-modulation parts and backs off for at least the duration of the received packet. However, this reduces the chance to perform spatial reuse because if the packet is from OBSS, the STA may still be able to transmit if the received packet from OBSS is below a certain signal strength level, e.g., a given clear channel assessment (CCA) level. On the other hand, if the packet is from its own BSS, the STA shall back off even if the signal strength is low.

In VHT WLAN, uplink traffic can be identified using partial AID since it is basically partial BSSID. Contrarily, in current WLAN based on IEEE 802.11a/b/g/n/ac standards, there's no feasible way to identify whether the downlink traffic (AP to non-AP STAs) is from its own BSS or from OBSS and therefore spatial reuse opportunities are reduced.

It is desirable to have a solution to increase the chance to perform spatial reuse VHT stations.

SUMMARY

A method for identifying source BSS in WLAN is proposed. A high efficiency (HE) access point (AP) sends a packet containing a basic service set (BSS) color to a HE station. The HE AP also sends a packet containing an assigned association identification (AID) to a very high throughput (VHT) station. The assigned AID comprises at least part of the BSS color information. The VHT station therefore sends a packet containing the at least part of the BSS color information such that any AP or station that receives the packet can determine the BSS the VHT station is in.

DETAILED DESCRIPTION

Reference will now be made in detail to some embodiments of the invention, examples of which are illustrated in the accompanying drawings.

Figures 1, 2, 3:
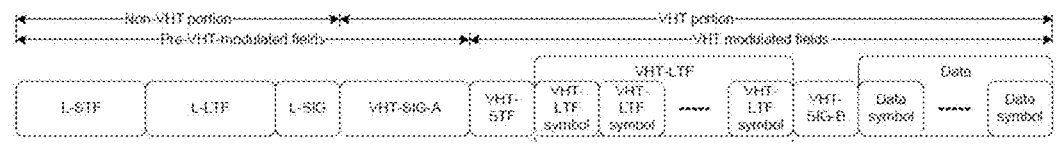
FIG. 1 illustrates a VHT_SIG-A1 Structure according to IEEE 802.11ac standard.
FIG. 2 illustrates a VHT PPDU Format.
FIG. 3 illustrates a SIG-1 structure of IEEE 802.11ah non-1 MHz PPDU.

In the IEEE 802.11ah standard, in the sub-1 GHz band, BSS color is introduced for identification of which BSS the packet is from. For a non-1 MHz PPDU, the IEEE 802.11ah standard implements a 1-bit UPLINK field and a 9-bit ID field in the SIG-1 symbol, as shown in FIG. 3. If the field UPLINK is not presented or set to 1, the ID field represents the 9-bit PARTIAL BSSID. If the UPLINK filed is set to 0, B7-B9 of the ID field are set to the value of the BSS color and B10-B15 are set as 6-bit $PARTIAL_{13}$ AID. In this case, the source BSS of a downlink packet can be identified by checking the UPLINK field and BSS color in the ID field. Therefore the high spatial reuse can be achieved when a downlink communication is performed.

However, in the WLAN that is operated in the 2.4 GHz or 5.8 GHz bands, VHT STAs and the next generation High Efficiency (HE) STAs could co-exist in the same BSS. In dense network scenarios, identifying packets from OBSS and packets of its own BSS is crucial to perform spatial reuse such that the network throughput can be improved. The next generation HE STA here can be referred to as STAs that are compatible with the high efficiency standard or any later standards. And the VHT STAs can be referred to as non-HE STAs or the STAs compatible with IEEE 802.11ac standard.

In next generation HE WLAN that is operated in 2.4 GHz or 5.8 GHz band, BSS color should be introduced to identify the source BSS of a packet.

Figure 4:
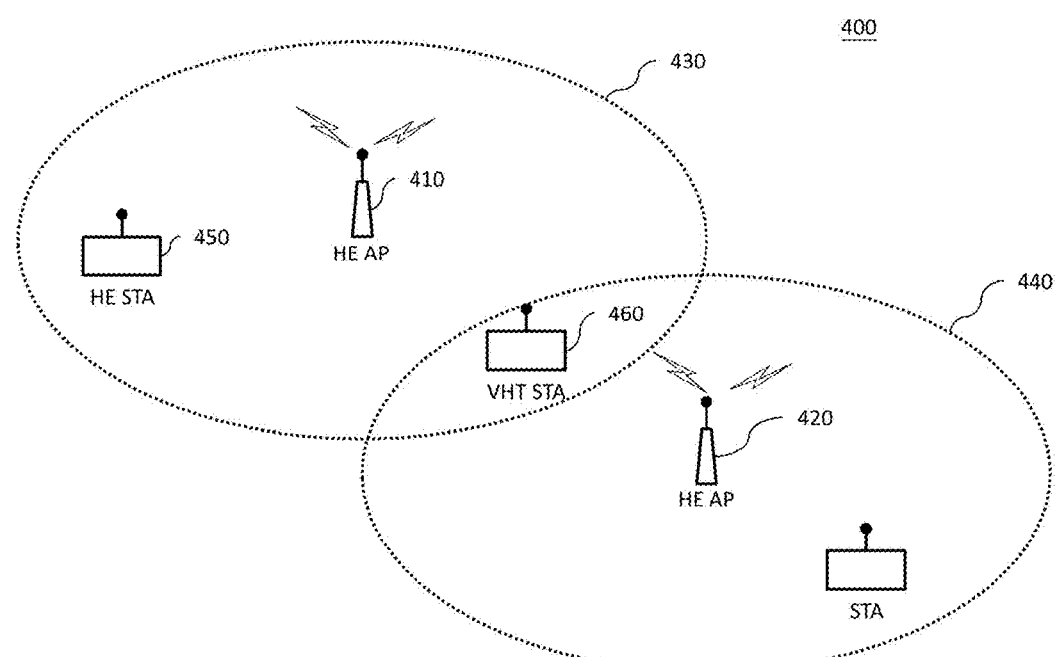
FIG. 4 is a wireless communications system in accordance with one novel aspect.

Please refer to FIG. 4, which illustrates a wireless communications system 400 according to an embodiment of the present invention. In the wireless communications system 400, there are two access points (AP) 410 and 420, which respectively form two basic service sets (BSSs) 430 and 440 that overlap each other. Therefore, the BSS 430 and 440 form overlapped basic service set (OBSS). The APs 410 and 420, for example, can be High Efficiency (HE) APs. The station (STA) 450 is a HE STA within the BSS 430, and the STA 460 is a Very High Throughput (VHT) STA that locates in the overlapped area of the two BSSs 430 and 440. In the current example, the VHT STA 460 is serviced by the HE AP 410.

The HE AP 410 first chooses or determines basic service set (BSS) color information and inserts the BSS color information in all the HE packets sent by the HE AP 410 to the HE STA 450. The HE STA 450 adds the BSS color information into the packets it sends out. Any HE AP and HE stations that receives the packet from the HE STA 450 can extract the BSS color information to determine whether the packet sent from HE STA 450 is within the AP's BSS.

However, the HE APs and HE stations cannot identify the BSS of the packets sent from the VHT station 460 because there is no BSS color information inserted in VHT packets. Therefore, according to an embodiment of the present invention, the HE AP 410 assigns an Association Identifier (AID) and inserts it into a packet sending to the VHT STA 460. The assigned AID is associated with the BSS color information chosen by HE AP 410. Since the assigned AID to VHT station contains the BSS color information or partial BSS color information, the partial AID in the VHT packets sent by HE AP 410 to the VHT STA 460 contain the BSS color information or partial BSS color information.

According to an embodiment of the present invention, N bits can be allocated as BSS color bits (BCB) in the HE-SIG symbols to indicate the BSS color. For example, N could be 1, 2, 3, or 4. BCB can be independent of partial AID bits or some part of partial AID bits. Considering an exemplary WLAN BSS which is composed of VHT STAs and HE STAs. The 9 LSBs (Least Significant Bits) of AID can be decided differently. For example, the HE AP sets (8-N+1:8) bits in AID according to following equation when it assigns AID to the associated VHT STAs, $$AID(8-N+1:8)=bin[(dec(BCB(0:N-1))+dec(BSSID(47-N+1:47)\oplus DBSSID(43-N+1:43)))mod\ 2^N, N] \quad (1)$$

where bin[x,N] is the cast to N-bit binary operator.

Figure 5:
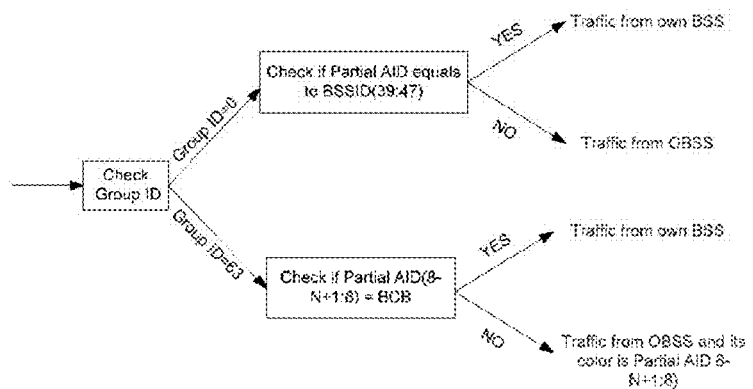
FIG. 5 illustrates a flowchart in accordance with one novel aspect.

Hence, the (8-N+1:8) bit in PAID in VHT packets automatically becomes the BSS color. Using PAID (8-N+1:8) in VHT packets is better than using PAID (0:N-1) because VHT only BSS likely has one VHT device has the lower PAID bits that is same as BSS color bits. FIG. 5 therefore illustrates a flowchart to determine which BSS the packet is from according to AID information.

According to another embodiment of the present invention, when N (N=1,2,3, 4 or 5) BSS color bits (BCB), the HE AP sets (0:N-1) bits in AID according to following equation when it assigns AIDs to the associated STAs $$AID(0:N-1)=BCB(0:N-1) \quad (2)$$

Figure 6:
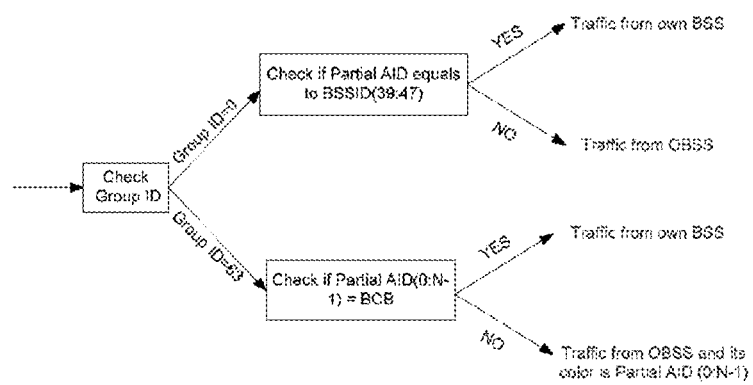
FIG. 6 illustrates a flowchart in accordance with one novel aspect.

Then the PAID (0:N-1) bits in VHT packets sent from the HE AP automatically becomes the BSS color. FIG. 6 therefore illustrates a flowchart to determine which BSS the packet is from according to AID information.

For N>5, the above two methods can be combined to generate the AID or partial BSS color can be used for AID assignments.

After assigning the AID to STA 460, the partial AID information which contains the BSS colour or the partial BSS colour information is inserted into the packets sent to VHT STA 460. Therefore, when the HE AP 420 and the HE stations in its BSS receive the packet from the VHT STA 460, the HE AP 420 can extract the BSS colour information from the partial AID and determines that the packet is sent from the OBSS that VHT STA 460 belongs to. The HE AP 420 and HE stations in its BSS can therefore begin spatial reuse process to efficiently use the channel.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) sending by a high efficiency (HE) access point (AP) to an HE station a first packet containing a basic service set (BSS) color information;
   (b) sending by the HE AP to a very high throughput (VHT) station (STA) a second packet containing an assigned association identification (AID), wherein the assigned AID comprises at least part of the BSS color information, comprising:
   assigning (8−N+1:8) bits in the AID with the at least part of the BSS color information according to, $$AID(8-N+1:8)=bin[(dec(BCB(0:N-1))+dec(BSSID(47-N+1:47)\oplus BSSID(43-N+1:43)))mod\ 2^N, N]$$

wherein N is the number of bits of BSS color, BCB is BSS color bits, and BSSID is the BSS identification assigned by the HE AP; and
   (c) sending by the VHT STA the second packet containing the at least part of the BSS color information,
   wherein the HE AP, the HE STA and the VHT STA are in the same BSS.

2. The method of claim 1, wherein the assigned AID comprises complete BSS color information.

3. The method of claim 1, further comprising,
   receiving by another HE AP the second packet sent from the VHT STA; and
   discarding the second packet by the another HE AP according to the BSS color information.

4. The method of claim 3, wherein the discarding step comprises,
   comparing (8−N+1:8) bits in the AID field with a BSS color information of the another HE AP,
   wherein N is the number of bits of BSS color.

5. The method of claim 3, further comprising,
   performing by the another HE AP a spatial reuse process.

* * * * *